US012645649B2

(12) United States Patent　　　　(10) Patent No.: US 12,645,649 B2
Druta et al.　　　　　　　　　　　　(45) Date of Patent: Jun. 2, 2026

(54) AUTOMATIC DATABASE SCHEMA UPDATE FROM ONE SCHEMA TO ANOTHER

(71) Applicant: MASTERCARD INTERNATIONAL INCORPORATED, Purchase, NY (US)

(72) Inventors: Vladut Druta, Dublin (IE); Dawid Nowak, Dublin (IE); John Allen, Newcastle (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 54 days.

(21) Appl. No.: 18/167,055

(22) PCT Filed: Jul. 15, 2021

(86) PCT No.: PCT/US2021/041865
§ 371 (c)(1),
(2) Date: Feb. 9, 2023

(87) PCT Pub. No.: WO2022/035553
PCT Pub. Date: Feb. 17, 2022

(65) Prior Publication Data
US 2024/0311349 A1　　Sep. 19, 2024

(30) Foreign Application Priority Data

Aug. 11, 2020　(GB) .................................... 20190511

(51) Int. Cl.
*G06F 16/21* (2019.01)
(52) U.S. Cl.
CPC .................................. *G06F 16/213* (2019.01)

(58) Field of Classification Search
None
See application file for complete search history.

(56) References Cited

U.S. PATENT DOCUMENTS

| | | | | |
|---|---|---|---|---|
| 6,029,174 | A * | 2/2000 | Sprenger | ................ G06Q 30/04 |
| 6,275,832 | B1 * | 8/2001 | Watts | .................. G06F 16/2379 |
| | | | | 707/999.203 |
| 9,946,534 | B1 * | 4/2018 | Thompson | .......... G06F 16/2365 |
| 9,971,595 | B1 * | 5/2018 | Thompson | ................ G06F 8/71 |
| 10,949,197 | B1 * | 3/2021 | Wang | .................... G06F 16/213 |
| 11,853,904 | B2 * | 12/2023 | Puri | ........................ G06N 5/022 |
| 2005/0234934 | A1 * | 10/2005 | Mackay | .............. G06F 16/2471 |
| 2005/0243604 | A1 * | 11/2005 | Harken | ..................... G06F 8/51 |
| | | | | 365/185.22 |
| 2005/0251533 | A1 * | 11/2005 | Harken | ................. G06F 40/143 |

(Continued)

OTHER PUBLICATIONS

Zhuravlev, S., "International Search Report & Written Opinion", International Application No. PCT/US21/041865, mailed Oct. 14, 2021, 8 pages.

*Primary Examiner* — Farhan M Syed
(74) *Attorney, Agent, or Firm* — Barta Jones, PLLC

(57) ABSTRACT

A computer implemented method for updating a database schema. The method comprises reading (101*a*, 101*b*) and then comparing (102) first and second database schemata. Tasks are then generated (103) in dependence on the comparison. The tasks are for converting a database defined by the first schema into a database defined by the second schema. The tasks are then executed (104) in a defined order in order to carry out the database update.

20 Claims, 9 Drawing Sheets

(56)            References Cited

U.S. PATENT DOCUMENTS

| | | | |
|---|---|---|---|
| 2005/0256892 A1* | 11/2005 | Harken | G06Q 10/10 |
| 2008/0168109 A1* | 7/2008 | Gaurav | G06F 16/213 |
| | | | 707/999.203 |
| 2010/0228764 A1 | 9/2010 | Sallakonda et al. | |
| 2016/0210342 A1* | 7/2016 | Vallabhaneni | G06F 3/0619 |
| 2018/0285407 A1 | 10/2018 | Austin et al. | |
| 2019/0258468 A1* | 8/2019 | Chanda | G06F 11/1433 |
| 2020/0233841 A1* | 7/2020 | Ormerod | G06F 16/213 |
| 2020/0364242 A1* | 11/2020 | Martin | H04L 43/067 |
| 2021/0191903 A1* | 6/2021 | Shetty | G06F 16/128 |
| 2023/0113558 A1* | 4/2023 | Johnson | G06F 16/2246 |
| | | | 707/803 |

* cited by examiner

Figure 7:
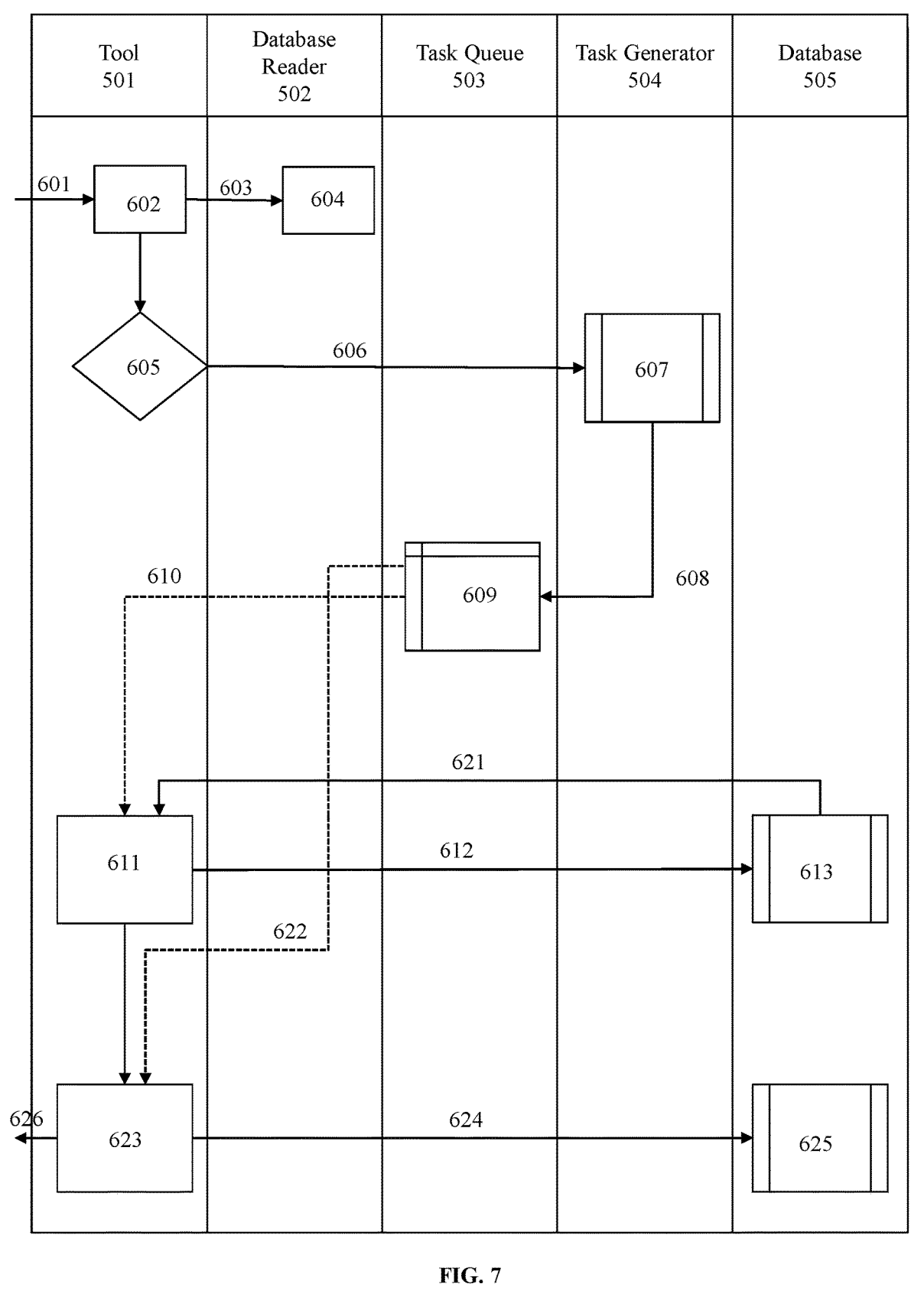

| Tool 501 | Database Reader 502 | Task Queue 503 | Task Generator 504 | Database 505 |
|---|---|---|---|---|

AUTOMATIC DATABASE SCHEMA UPDATE FROM ONE SCHEMA TO ANOTHER

CROSS REFERENCE TO RELATED APPLICATION

This application claims the benefit of priority to International Application No. PCT/US21/041865, filed Jul. 15, 2021, entitled "Automatic Database Schema Updater", which claims the benefit of priority to European Patent Application No. 20190511.4, filed on Aug. 11, 2020, entitled "Automatic Database Schema Updater", the contents of each application is hereby incorporated by reference for all purposes.

TECHNICAL FIELD

The present disclosure relates to a computer implemented method for updating a database schema, and apparatus and instructions for updating database schema

BACKGROUND

Updating a database from one schema to another is often performed manually and can cause errors in the structure of the database or corruption of the data.

In current solutions a difference script, a validation script and a back-out script are manually written for each version of a database schema. This allows the iteration of a database from a first version to a second version. Subsequent versions can then be sequentially updated from second to third, third to fourth, and fourth to fifth and so on. Each of these scripts must be stored, numbered and otherwise managed which increases administrative and storage requirements for database management as well as introducing multiple areas in which errors may occur (either human or computer generated).

It is an object of the invention to provide improvements over the prior art.

STATEMENTS OF INVENTION

An aspect of the invention provides a computer implemented method for updating a database schema. The method comprises reading first and second database schemata, comparing the first and second database schemata, generating execute tasks for converting a database defined by the first schema into a database defined by the second schema in dependence on the comparison, and executing the generated execute tasks in a defined order.

The first and second schemata may be read in parallel or in any order.

The method may further comprise generating undo tasks. Each undo task may be a reverse task corresponding to a respective execute task of the generated execute tasks.

If, during execution of the execute tasks, an error occurs, the method may further comprise undoing the executed execute tasks, up to and including the task in which the error occurred, by executing the undo tasks.

Undoing the previously executed execute tasks may comprise undoing the execute tasks in the reverse order to which they were executed.

The method may further comprise generating clean tasks, wherein the clean tasks are tasks for cleaning the database.

If all of the execute tasks are executed successfully, the method may further comprise executing the clean tasks.

Executing the clean tasks and/or cleaning the database may comprise finalising the effects of the execute tasks. Executing the execute tasks may comprise creating a temporary database. Executing the clean tasks may then comprise creating a new database or overwriting the original database and discarding the temporary database.

Comparing the first and second database schemata may comprise comparing the number of entities in each schema and comparing the number of foreign keys in each schema.

The second schema may comprise information relating to the first schema. For example, the second schema may comprise a history of changes from the first schema. Similarly, any subsequent schema may comprise a history of the preceding schema(ta) upon which it was based. The history of the preceding schema or schemata may be used to identify what tasks are required to update the database defined by the first schema to the database defined by the second schema.

The method may further comprise storing the execute tasks in a queuing mechanism in preparation for their execution in the defined order. The method may further comprise storing the undo tasks in the queuing mechanism in parallel or in a reverse order to the execute tasks. The method may further comprise storing the clean tasks in the queuing mechanism in parallel to the execute tasks.

The defined order may be determined, at least in part, in dependence on foreign key information of the schemata, and optionally in which a delete foreign key task is ordered to occur before a rename task and a recreate foreign key task is ordered to occur after the rename task.

Foreign key information may be any information that relates to the foreign keys within the schemata. For example, the number of foreign keys, the entities and elements linked to or by foreign keys and the entity and element names associated with foreign keys are all possible information types that may be used to determine the task ordering.

If the execution of the execute tasks fails, the method may further comprise outputting a proposed mitigation to mitigate further failures.

A further aspect of the invention provides a data processing apparatus/device/system comprising a processor configured to perform the method of the preceding aspect.

A further aspect of the invention provides a computer program comprising instructions which, when the program is executed by a computer, cause the computer to carry out the method of the first aspect.

A further aspect of the invention provides a non-transitory computer-readable storage medium comprising instructions which, when executed by a computer, cause the computer to carry out the method of the first aspect.

BRIEF DESCRIPTION OF THE DRAWINGS

Embodiments of the invention may be understood, by way of example only, with reference to the accompanying drawings, in which:

FIG. 7 provides a further process flow diagram for a computer implemented method of updating a database schema executed on a computer system;

DETAILED DESCRIPTION

A database may be separated into multiple entities. Each entity may comprise multiple elements. One of the elements in each entity is assigned to be the identification element—designated as "id( )" in SQL. The identification elements allows for the indexing of the entity. An example of an entity is a table, and an example of an element is a column within that table. For clearer and 2D representation the figures and examples provided use this basis, entities=tables and elements=columns, the skilled person would understand that the same techniques are applicable to other database formats and methodologies.

Where elements feature in multiple entities a foreign key is assigned in order to map the association between the entities.

Method

Figure 1:
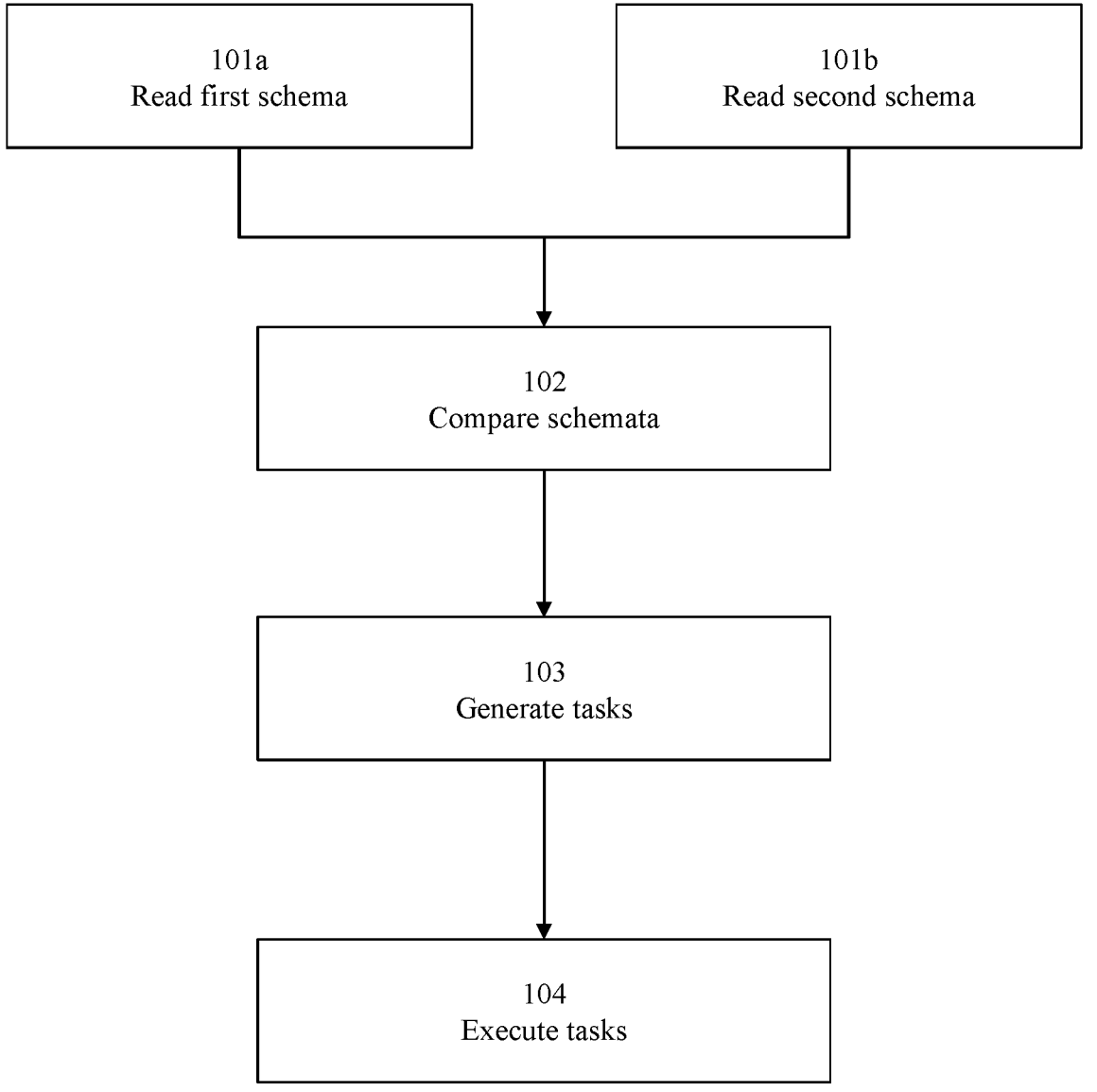
FIG. 1 provides a process flow diagram for a computer implemented method of updating a database schema.

The process flow shown in FIG. 1 provides the steps of a method of updating a database from a first schema to a second schema. The first schema is an existing schema of the database and the second schema is a desired schema of the database.

In a first pair of steps 101*a*, 101*b* the first and second schemata are read. Reading the schemata comprises assessing the various features and characteristics of each schema in order to extract relevant information pertaining to each schema. The relevant information may comprise the number of entities, the number of elements within each entity, the names of the entities and elements, the number of foreign keys, the data types and data input restrictions for each element, and any other relevant information that defines the schema.

Once both of the schemata are read they are compared in a second step 102 in order to determine the differences between them. In some embodiments the first schema and second schema may be translated into an open-standard data interchange format such as JSON before comparison.

Comparing the schemata comprises assessing what changes are required to modify the first schema into the second schema. For example, the comparison may comprise determining whether the number of entities, elements or foreign keys has changed, whether any names have changed, whether any data types have changed, and any other relevant changes. The second schema may comprise previous schema versions of a target database schema to be updated. For example, the second schema may, in addition to including the desired database scheme, include all previous database schema for the target database, so that changes can be accurately applied. For example, a desired entity name in the second schema may be accompanied by at least one previous name for that entity or element, thereby enabling easy recognition of the necessary changes (e.g. in relation to that entity or element).

The identified changes are used to generate tasks in a third step 103. Generating the tasks comprises generating tasks for executing the changes required to update the first schema to the second schema. These tasks may therefore be referred to as execute tasks.

The generated tasks are then executed at a fourth and final step 104. Once all of the tasks are executed the database is updated to the second schema.

Generating the tasks based on the comparison provides a more accurate and efficient method of updating schemata over prior art systems. The generation of all tasks before execution ensures that errors can be identified and undone with fewer intervening steps and with reduced risk of data corruption over methods of the prior art.

Figure 2:
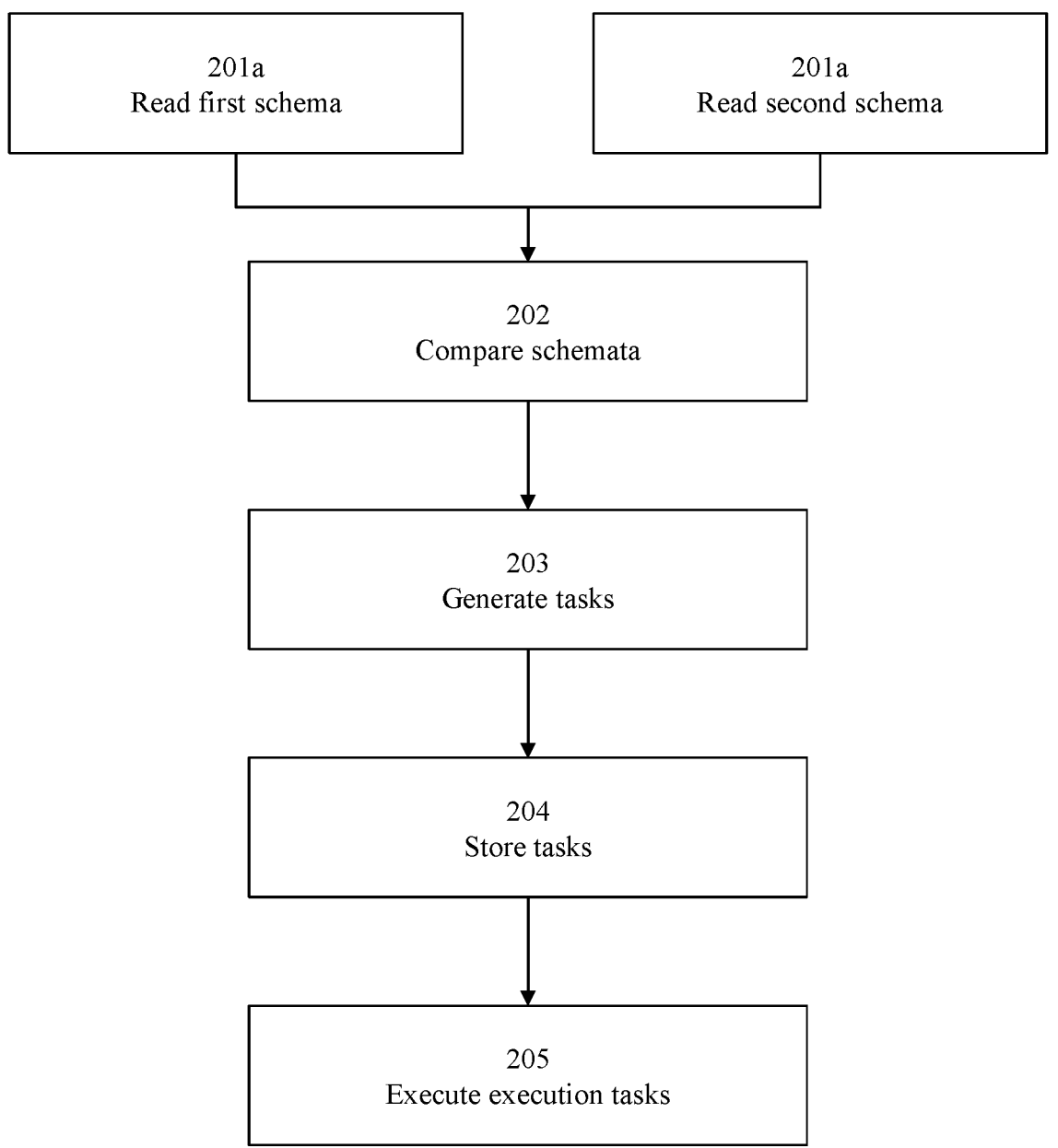
FIG. 2 provides a further process flow diagram for a computer implemented method of updating a database schema.

A second process flow is shown in FIG. 2. The first pair of steps 201*a*, 201*b*, and the second and third steps 202, 203 correspond to the respective steps of FIG. 1.

In a fourth step 204 the tasks are stored in preparation for execution. The tasks are stored in an order that increases the probability of a successful execution when the tasks are executed in order. Executing some tasks before others increases the likelihood of a successful execution. In particular, tasks that may affect a key (e.g. a foreign key) are preferably ordered and subsequently executed in a way that reduces the chances of errors occurring. If an execute task is generated that may affect a key then further tasks are generated. The further tasks include a key deletion task and a key recreation task. The key deletion task is queued before the task that may affect the key, such that when it comes to executing the task the key is deleted before the task that may have affected it is executed. The key creation task is queued after the task that may affect the key, such that once the task is executed the key can be recreated taking into account any changes that may have occurred (an entity or element rename for example).

In a fifth and final step 205 the tasks are executed. The tasks are executed in the order in dependence upon the order in which they were stored.

Storing the tasks in a specific order, and subsequently executing them in said order, further enhances robustness and efficiency of the updating process over prior art systems. Storing and executing the tasks in a defined order provides improved management of keys over prior art systems, as tasks related to keys are identified and sub-tasks queued in an efficient order than can reduce the likelihood of errors or corruption.

Figure 3:
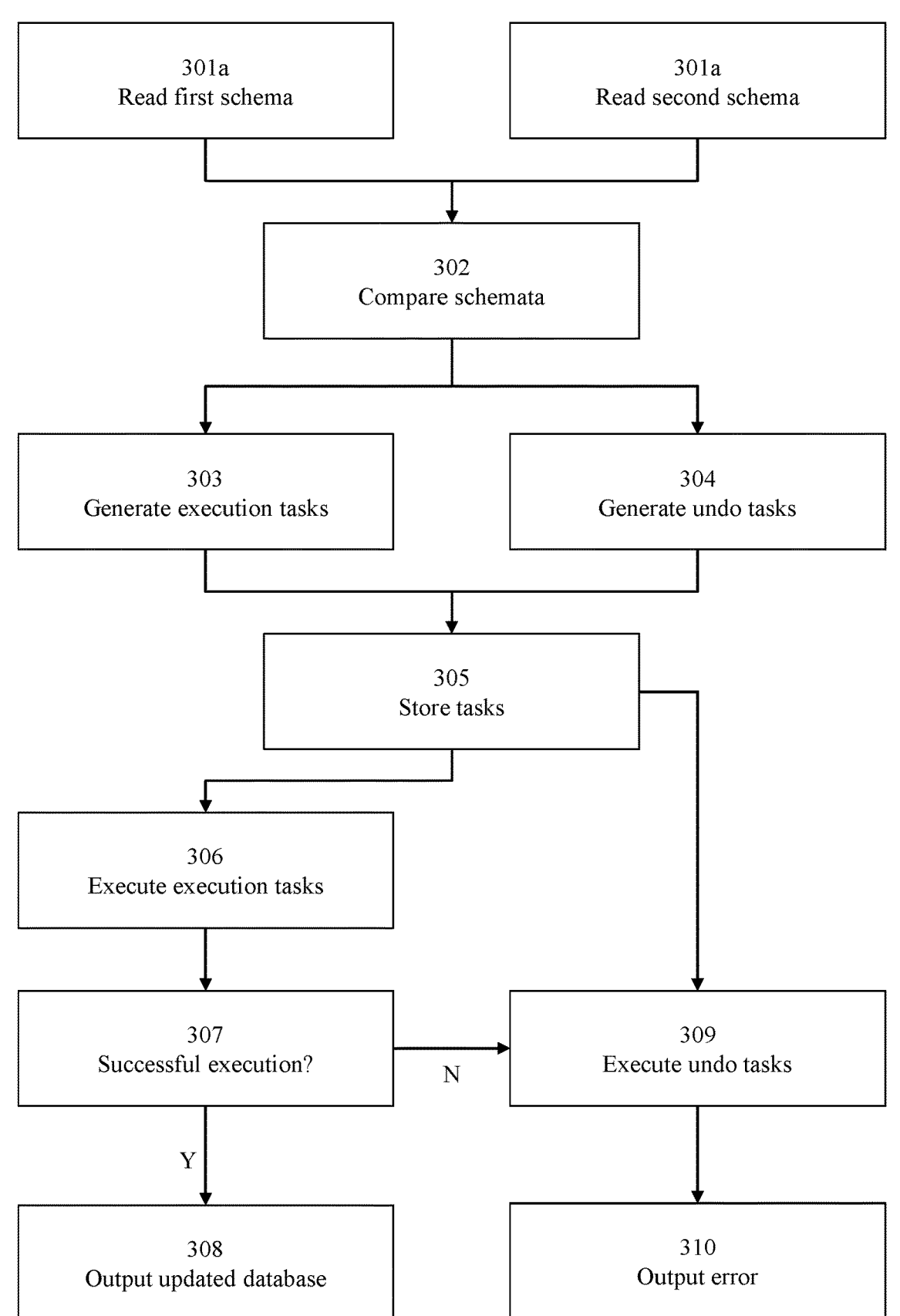
FIG. 3 provides a further process flow diagram.

A third process flow is shown in FIG. 3. The first pair of steps 301*a*, 301*b*, and the second step 302 correspond to the respective steps of FIGS. 1 and 2.

In the next steps 303, 304 tasks are generated as in FIG. 1 and FIG. 2, but in this case two sets of tasks are generated. A first set of tasks is the execute tasks, generated in the third step 303, and a second set of tasks is a set of undo tasks, generated in the fourth step 304. Each undo task corresponds to a respective execute task. The undo tasks are tasks that define a reverse action that, when executed, undo their respective execute tasks. The third step 303 of generating the execute tasks and the fourth step 304 of generating the undo tasks may be performed in parallel or in any order. The third and fourth steps 303, 304 may form a single step in which execution and undo tasks are generated as pairs, with a first pair of execution and undo tasks being generated, and then a second pair of execution and undo tasks being generated, and so on and so forth until all required tasks have been generated.

The tasks may be stored in a fifth step 305 in a similar manner to the fourth step 204 of FIG. 2. The execution and undo tasks may be stored in parallel or in any way that references their relationships.

As per the previous figures the execute tasks are executed in a sixth step 306.

At a seventh step 307 a check is made as to whether the execute tasks were carried out successfully. The check may be performed in parallel with the execution of the execute tasks 306, wherein each execute task is checked for successful execution immediately after it has been carried out. The seventh step 307 may be performed as part of the sixth step 306, in that a failed execution may automatically report failure in the event of a failed execution.

If all of the execute tasks are executed successfully then an eighth and final step 308 is performed and the updated database, now defined by the second schema, is output. Corresponding steps of outputting the updated database may be an automatic part of the final steps 104, 205 of each of the processes of FIGS. 1 and 2

If any of execute tasks are determined at the seventh step 307 to not have been executed successfully then the process moves to a ninth step 309 of executing the undo tasks. Executing the undo tasks comprises undoing the execute tasks already executed up until the point of failure in the reverse order to which they were executed.

Once the undo tasks have been executed, and the executed execute tasks thereby undone, then an error message is output in a tenth and final step 310. The error message comprises details as to where or at what point the error occurred, i.e. which execute task failed and at what point, and what a possible mitigation action may be in order to prevent a future error should the update be retried.

Generating respective execute and undo tasks in parallel based on the comparison ensures that the executed tasks can effectively be 'rewound' to an error point. This provides a means by which a failed update can be rewound to the point of failure without losing data. The error can then be identified and rectified. This provides improved data security and retention, as well as improved efficiency in updates over prior art systems.

Figure 4:
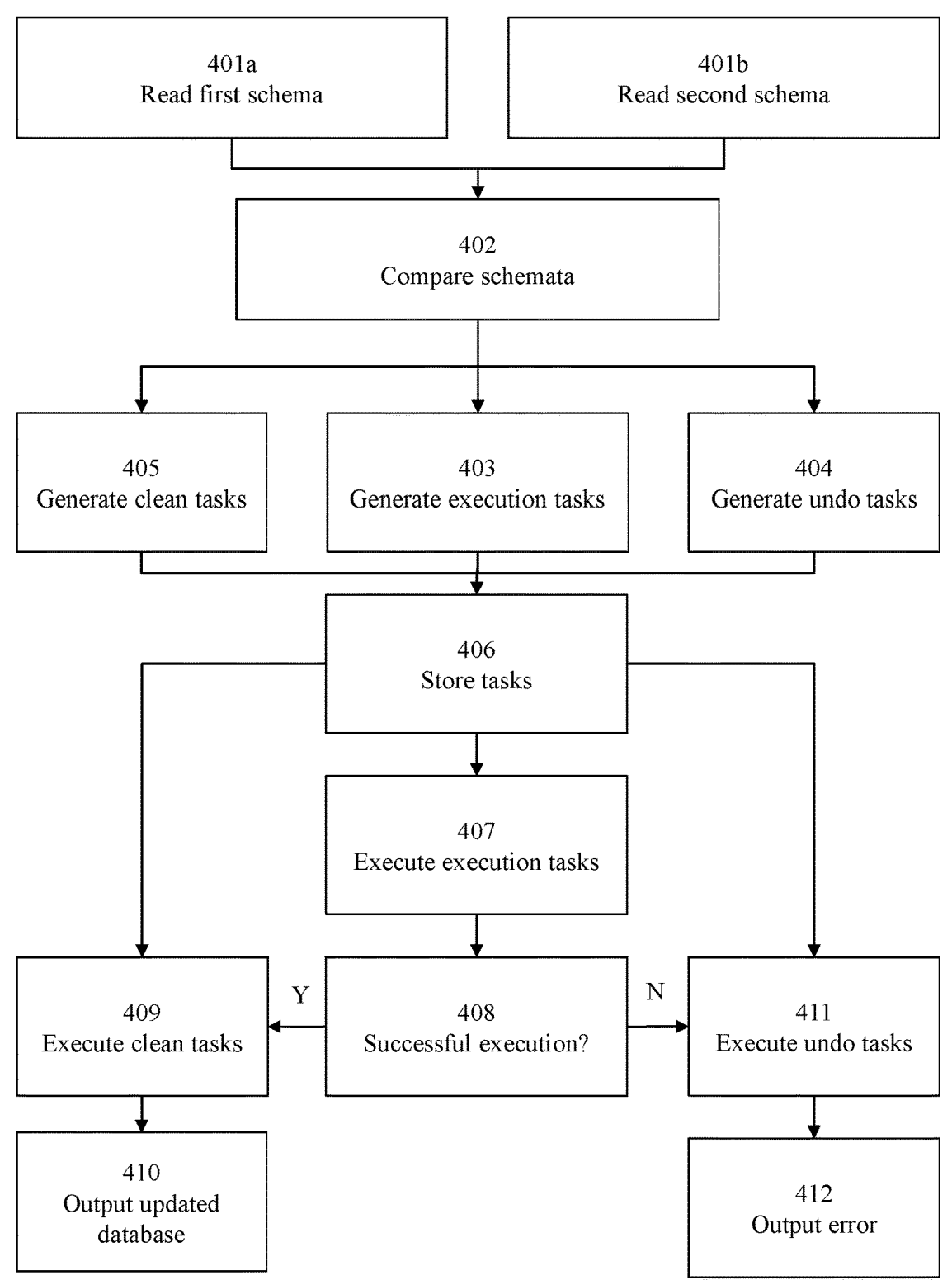
FIG. 4 provides a further process flow diagram for a computer implemented method of updating a database schema.

A fourth process flow is shown in FIG. 4. The first pair of steps 401*a*, 401*b*, and the second step 402 correspond to the respective steps of FIGS. 1, 2 and 3 and the third and fourth steps correspond to the respective steps of FIG. 3.

In a fifth step 405 a third set of tasks is generated. The third set of tasks is a set of clean tasks. As with the undo tasks, each clean task corresponds to a respective execute task. The clean tasks are tasks that define a cleaning action to be carried out to clean the database once all of the execute tasks are carried out successfully. The clean tasks may be configured to make permanent any execute tasks. In these examples the execute tasks may be draft tasks, which, when executed, carry out the task in a 'ghost' or draft database. The clean tasks then may be used to create a clean database defined by the second schema to replace the database defined by the first schema if the draft database is successfully created.

The tasks may be stored in a sixth step 406 in a similar manner to the respective steps of FIGS. 2 and 3. The execution, undo and clean tasks are stored in parallel or in any way that references their relationships.

As per the previous figures the execute tasks are executed in a seventh step 407.

At an eighth step 408 a check is made as to whether the execute tasks were carried out successfully. The check may be performed in parallel with the execution of the execute tasks 407, wherein each execute task is checked for successful execution immediately after it has been carried out. The eighth step 408 may be performed as part of the seventh step 407, in that a failed execution may automatically report failure in the event of a failed execution.

If all of the execute tasks are executed successfully then a ninth step 409 is performed and the clean tasks are executed. The clean tasks make permanent all of the execute tasks and provide a clean database.

Once the database has been cleaned then a tenth and final step 410 is performed and the updated database, now defined by the second schema, is output.

If any of execute tasks are determined at the eighth step 408 to not have been executed successfully then the process moves to the eleventh and twelfth steps 411, 412, of undoing the execute tasks and outputting an error message, in the same manner as the respective steps of FIG. 3.

Generating clean tasks in parallel with the execute and undo tasks based on the comparison ensures that the executed tasks can effectively be 'rewound' to an error point or finalised. This provides a means by which a failed update can be rewound to the point of failure without losing data and a successful update outputted without any errors. Cleaning the tasks reduces data storage as the old schema can be replaced with the new schema. Queuing all three task types in parallel means that each execute task can be either undone or made permanent in dependence on the outcome of the update, without a requirement for inefficient error hunting or the risks associated with data loss or outdated schema.

System

Figure 5:
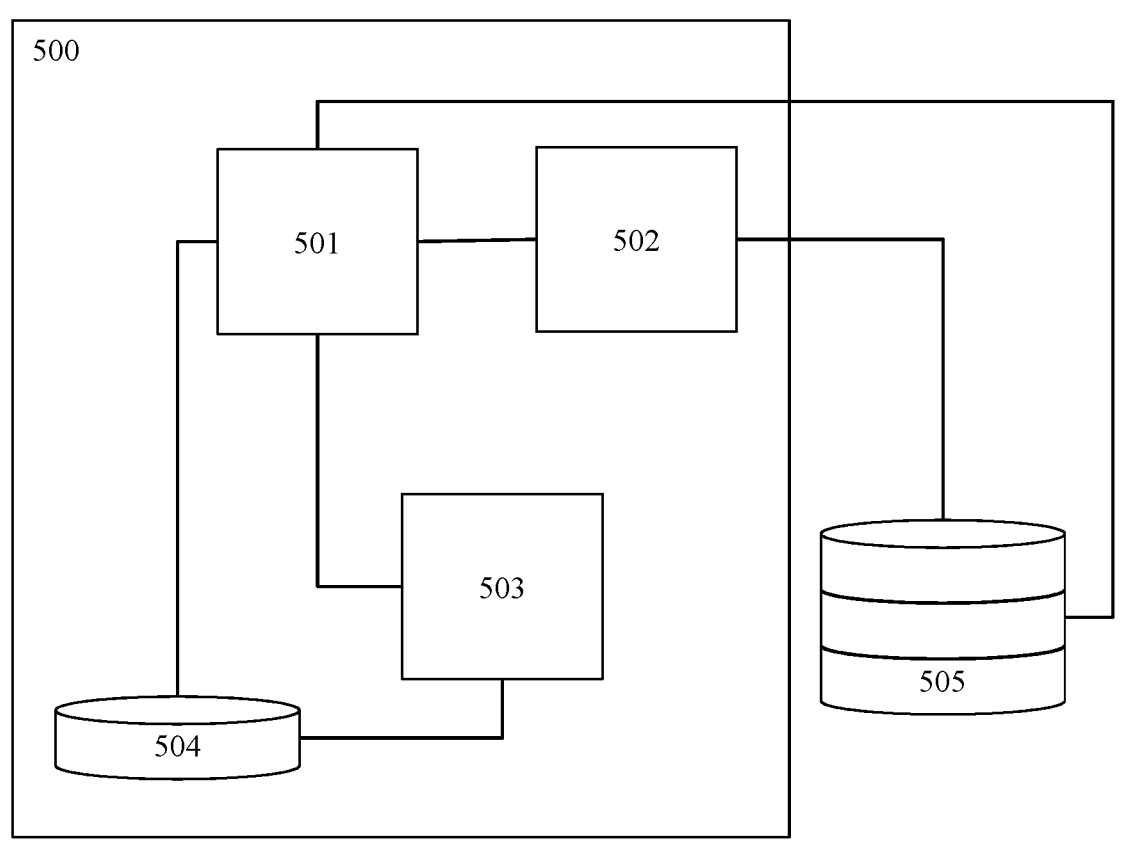
FIG. 5 provides a system diagram for a computer system for updating a database schema.

A system diagram is shown in FIG. 5, which is representative of a computer system 500 for updating a schema of a database 505. The computer system 500 may be configured to implement the methods of any one of FIGS. 1 to 4. The computer system 500 comprises a plurality of modules and is configured to update the database 505, defined by a first schema, to be defined by a second schema. The modules may be hosted on a single computer or across a distributed network of computers.

A first module of the computer system 500 is a database updater tool 501. The database updater tool (hereinafter referred to simply as 'tool') 501 is configured to receive and read a desired or expected schema (i.e. the second schema). The tool is further configured to compare the first schema to the second schema. The tool is further configured to carry out tasks in order to update the database 505 from the first schema to the second schema.

A second module of the computer system 500 is a database reader 502. The database reader 502 is configured to read an existing schema (i.e. the first schema) of the database 505. The database reader 502 is in communication with the tool 501 such that the first schema can be provided to the tool 501 in order for a comparison of the schemata to be made.

A third module of the computer system 500 is a task generator 503. The task generator is configured to generate tasks for updating the database 500. The tasks include execute, undo and clean tasks. The task generator 503 is in communication with the tool 501 and is configured to receive information relating to differences and/or changes between the first and second schemata. The task generator 503 is further configured to output the generated tasks.

A fourth module of the computer system 500 is a task queue 504. The task queue 504 may be provided on an electronic storage device. The task queue is in communication with the task generator 503 and is configured to receive the generated tasks. The task queue is formatted to store the three different sets of tasks in parallel, or otherwise cross referenced with respective tasks. Every execute task has a corresponding undo task and a corresponding clean task. The tasks are queued in a determined order and linked to their complimentary tasks in the other sets. The task queue 504 is in communication with the tool 501 such that the queued tasks can be provided to the tool for execution.

The database 505 may comprise instructions for processing the data within it.

Methods Implemented by System

Figure 6:
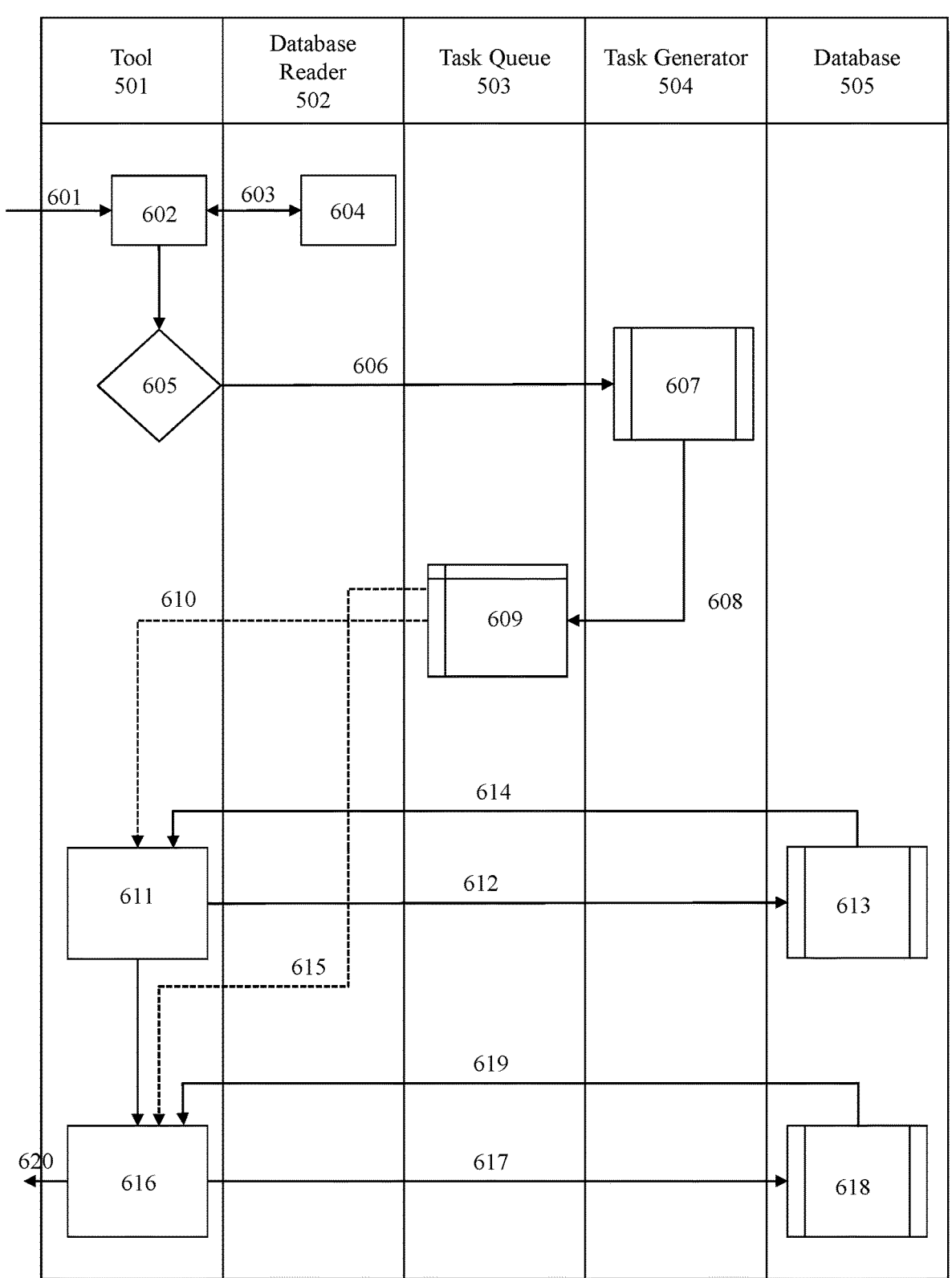
FIG. 6 provides a process flow diagram for a computer implemented method of updating a database schema executed on a computer system.

FIGS. 6 and 7 provide process flow diagrams for a computer implemented method of updating a database 505 when carried out on the computer system 500. FIG. 6 provides an example in which execution of the update is successful, and FIG. 7 provides an example in which the execution is unsuccessful.

In both figures the first step comprises receiving a command to execute a database update using the tool 501. The tool 502 receives a new database schema 601, the second database schema, and reads it 602. The tool sends a command 603 to the database reader 502 to read the existing database schema, the first schema. The database reader 502 reads the existing database schema 604 and provides the details of the schema back to the tool 501. The tool 501 then compares the two schemata 605 and outputs the changes 606 to the task generator 503. The task generator 503 generates three sets of tasks 607. The first set of tasks is a set of execute tasks, wherein the execute tasks are tasks which, when executed, carry out the necessary changes to update the database from the first schema to the second schema. The second set of tasks is a set of undo tasks, wherein the undo tasks are tasks which, when executed, undo the execute tasks. The third set of tasks is a set of clean tasks, wherein the clean tasks are tasks which, when executed, make permanent the execute tasks and finalise the updated database. The tasks are grouped across the sets. Each task group comprises one of each of the set of tasks: an execute task—to modify the schema, an undo task—to undo the modification made by the execute task, and a clean task—to make permanent the modification made by the execute task. The groups of tasks are output 608 by the task generator 503 to the task queue 504. The groups of tasks are queued 609 in a particular order in the task queue 503. The execute tasks define the order of the queue, in that some tasks may be required to be carried out before others, or result in less processes to be carried out (and therefore reducing the processing requirements in carrying them out) by being executed earlier or later in the update. The undo tasks are queued such that they follow the queue of the execute tasks and are configured to be carried out in reverse to the order of which their respective execute tasks were carried out. For example if execute tasks 1, 2, 3 then 4 are executed and an error occurs, then undo tasks 4, 3, 2 then 1 are executed, thereby reversing the effects of the execute tasks in the reverse order to which they were made. The clean tasks are queued such that they follow the queue of the execute tasks and are configured to be carried out in the same order of which their respective execute tasks were carried out. For example if execute tasks 1, 2, 3 then 4 are executed successfully (and those are all of the execute tasks), then clean tasks 1, 2, 3 then 4 are executed, thereby finalising the effects of the execute tasks in the same order to which they were made.

The tool 501 retrieves the execute tasks 610 from the task queue 504 and executes them in the order in which they were stored. The tool 501 executes the execute tasks 611 on the database 505 and the database 505 is iteratively updated. The database 505 may have database specific instructions embedded within it which may be triggered 612 by execution of one or more of the execute tasks. If the execute task is executed successfully, as well as any database specific instruction also being executed successfully 613, a confirmation 614 is passed to the tool to continue the update and the step repeats with the next execute task in the task queue 504. The execute tasks are executed 611 in the order in which they are queued in the task queue 504 either until all of the execute tasks are successfully completed or until an error occurs. FIG. 6 shows the next steps for a case in which all of the execute tasks are successfully completed and FIG. 7 shows the next steps for a case in which an error occurs at some point in carrying out the execute tasks.

If and when all of the execute tasks are completed successfully the process moves to a step of completing the transformation of the database 616 from the first schema to the second schema. Completing the transformation comprises executing the clean tasks 617 in the same order to which their respective execute tasks were executed. The tool 501 retrieves the clean tasks 615 from the task queue 504 and executes them in the order in which they are stored. As the executing the clean tasks effectively re-affirms the actions carried out by the execute tasks, the database specific instructions are also re-carried out 618 in order to completed the database transformation. A successful response is provided 619 to the tool and the step is repeated until all of the clean tasks are executed and then a final step of outputting the completed, transformed database 620 that has been updated to the second schema is carried out.

However, if an error occurs during the execution of the execute tasks then the process instead moves to the step of reverting the execute tasks 623 executed up until the point of the error. The error may occur due to the execute tasks being in an incorrect order, a discrepancy between the execute task and the database specific instructions, corrupted data and various other reasons that may be apparent to the skilled person. At whatever point the error occurs the tool 501 halts the execution of the execute tasks and takes a log of the point at which the error occurred (this may be by reference to a the failed execute task and a feature of the database that was the subject of the execute task, for example in an entity, element, or row) and the error is reported within the tool 621. The tool 501 then carries out the step of retrieving the undo tasks 622 from the task queue 504 and executing them 624 in the reverse order to which the execute tasks were executed, starting with the undo task that corresponds with the task preceding the failed execute task. Any database specific tasks are also reverted or carried out as appropriate during the revert 625. The undo tasks are in this way executed until the database is returned to its original configuration in which it was defined by the first schema. A log of the error and a possible mitigation action to prevent the recurrence of the error is output 626 by the tool 501. This ends the process. The first database schema is therefore safely retained in the event of an error, whilst also providing a means by which failure can be rectified. This ensures data recovery is maintained and updates reduce the chances of corruption over systems of the prior art. The identification of errors can also improve the efficiency of updates as errors can be more readily identified and rectified.

EXAMPLE SCHEMATA

In order to further explain the carrying out of the update using the above methods and/or system examples of schemata for database are provided below, followed by examples of carrying out the method or using the system on various combinations of the example schemata.

Figure 8:
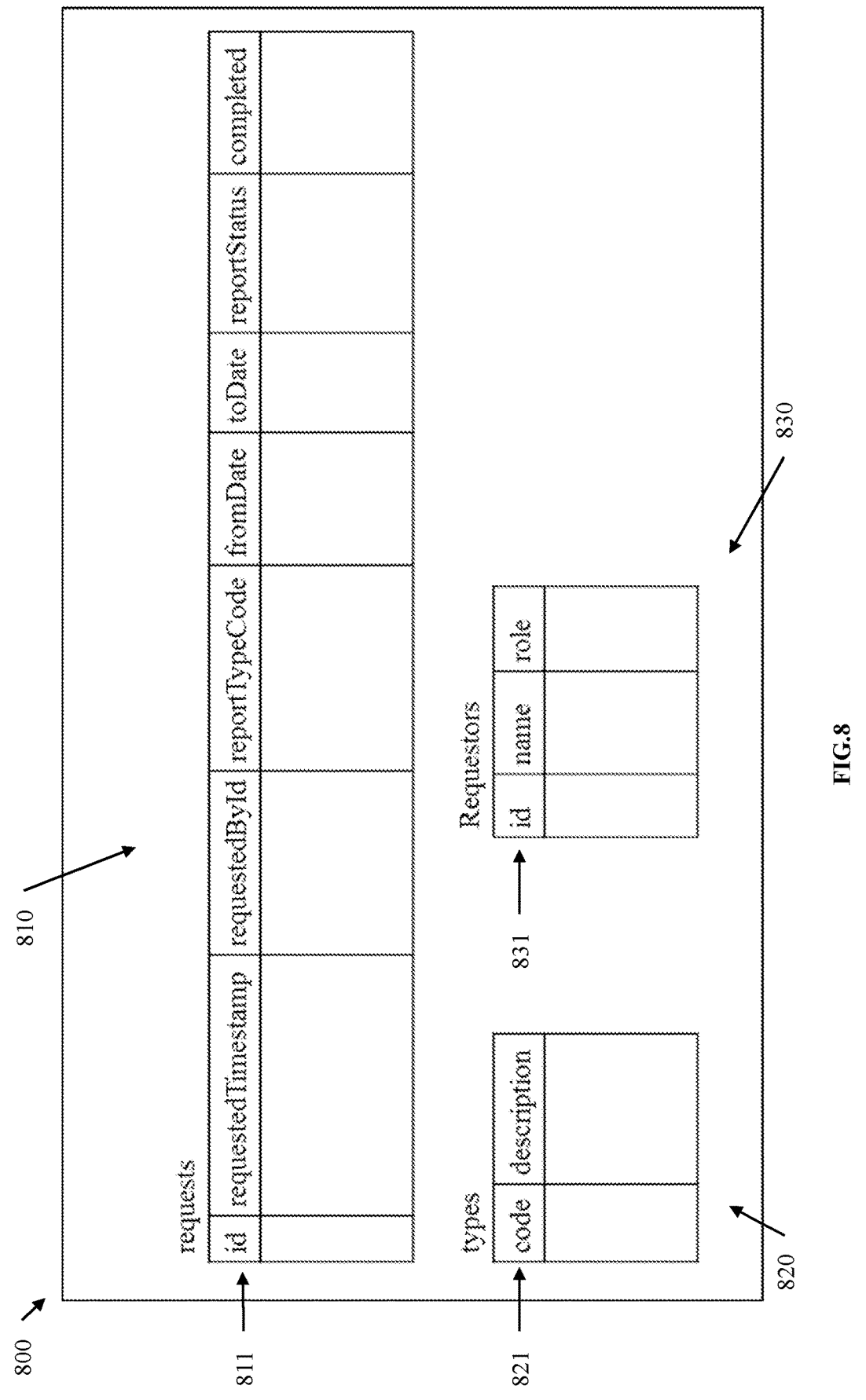
FIG. 8 provides a first visual representation of a database.
Figure 9:
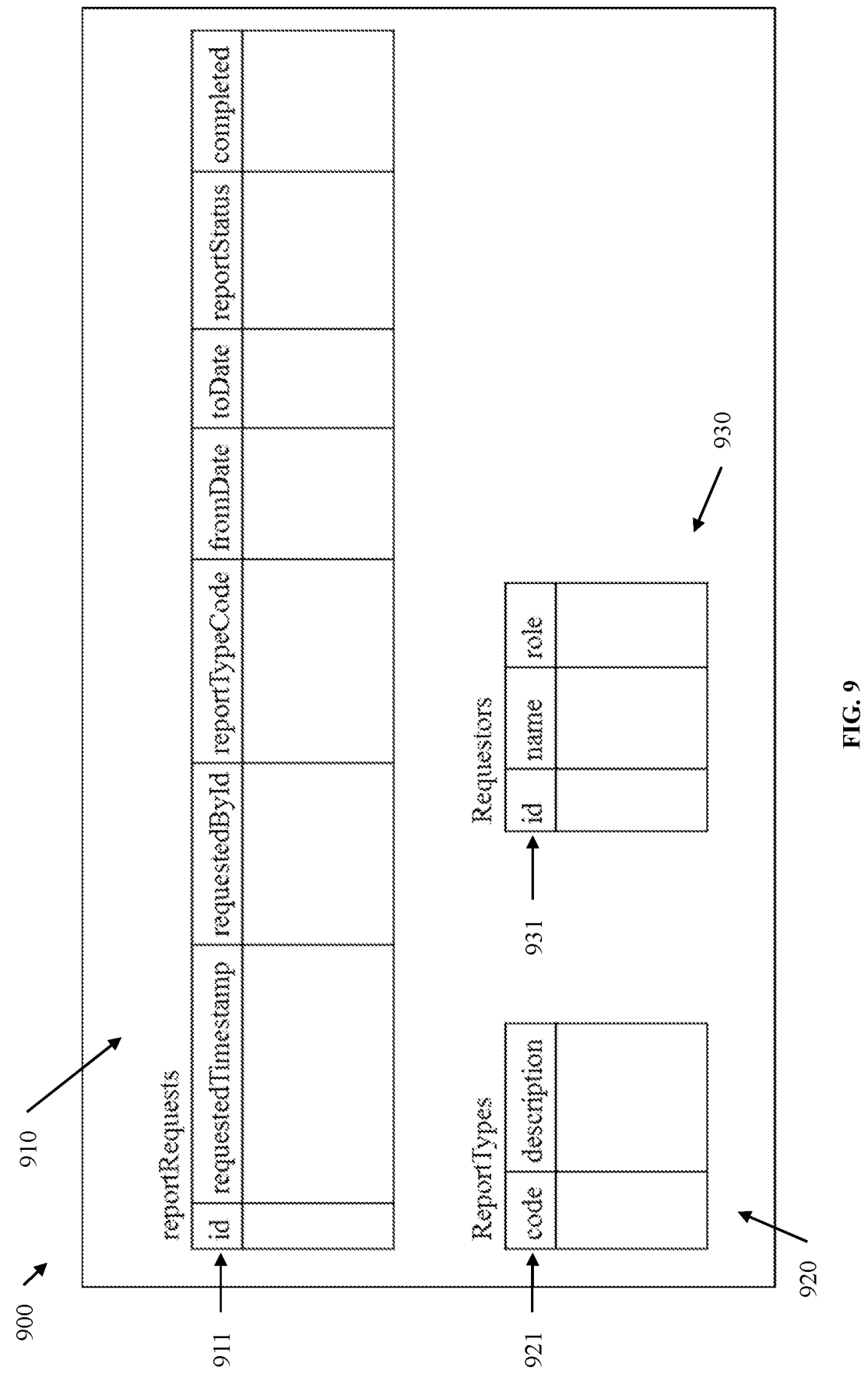
FIG. 9 provides a second visual representation of a database.

FIGS. 8 and 9 provide visual representations of the databases that may be defined by example schemata.

FIG. 8 shows an example database 800 defined by Schema v1. A requests entity 810 is represented as a first table, with its elements 811 represented as columns within the first table. A "types" entity 820 is represented as a second table, with its elements 821 represented as columns within the second table. A "Requestors" entity 830 is represented as a third table, with its elements 831 represented as columns within the third table.

FIG. 9 shows an example database 900 defined by Schema v2. A "reportRequests" entity 910 is represented as a first table, with its elements 911 represented as columns within the first table. A "ReportTypes" entity 920 is represented as a second table, with its elements 921 represented as columns within the second table. A "Requestors" entity 930 is represented as a third table, with its elements 931 represented as columns within the third table. As the names of the entities and elements remained unaltered between Schema v2 and Schema v3 a database defined by Schema v3 would also look like the database shown in FIG. 9.

The below examples are provided to illustrate the application of the conversion between various combinations of the schemata.

Example 1

In a first example an empty database is updated to Schema v1.

Both the desired schema and the schema of the empty database are read. As the empty database is as yet undefined the tool detects no entities or foreign keys in the existing schema. As Schema v1 comprises three entities and two foreign keys, the tool determines the requirements for the new database include that it comprises three entities and two foreign keys. The tasks to take into account these differences are then created. Five groups of tasks are created in total, three entity creation tasks and two foreign key creation tasks. The undo and clean tasks are also created in parallel with the creation tasks (i.e. execute tasks), but not reported in the log as the task creation of the tasks encompasses all three task types (execution, undo, clean). Once created the tasks are then executed.

Example 2

In a second example, a database defined by Schema v1 is updated to Schema v2.

Both the desired schema and the existing schema are read. The three entities and two foreign keys of Schema v1 are detected. As Schema v2 comprises three entities and two foreign keys, the tool determines the requirements for the new database include that it also comprises three entities and two foreign keys. Whilst the number of entities and foreign keys remains unchanged, various other changes have been made, including: a name change from "requests" to "reportRequests" of the first entity, a name change from "types" to "ReportTypes" of the second entity, and a data type change of the "requestedTimestamp" element of the first entity from a time stamp to a time stamp with a time zone.

In preparing tasks for the differences the tool takes into account the order in which tasks are best executed. For each entity which is renamed, the identification of that element must also be renamed such that it correctly references the new entity name. A task to rename the first entity 810 from "requests" to "reportRequests" is therefore followed by a task to rename the "id" element 811 of the first entity 810 from "requests ID" to "reportRequests ID". Once all the tasks for changes made to the entity 810 have been created a check is made to see whether any foreign keys may be affected. As none have no further actions are required for the first entity 810. The same steps are then taken for the second entity 820. A task to rename the second entity 820 from "types" to "ReportTypes" is therefore followed by a task to rename the "id" element 821 of the second entity 820 from "types ID" to "ReportTypes ID". Once all the tasks for changes made to the entity 820 have been created a check is made to see whether any foreign keys may be affected. In this case the ID element 821 is used as a foreign key to associate with the "reportTypeCode" element of the first entity 811 and so a foreign key is affected. The tool therefore creates two additional tasks; a foreign key drop task and a fore key creation task. The drop task is inserted before the element rename task and the creation task is inserted after the element rename task. As no changes are made to the third entity 830 no tasks are required with respect to it. Once all of the tasks have been generated and queued as above they are then executed. The tool outputs a notification of successful completion and a summary of the amended entities.

Example 3

In a third example a database defined by Schema v2 is updated to Schema v3.

Both the desired schema and the existing schema are read. The three entities and two foreign keys of Schema v2 are detected. As Schema v3 comprises three entities and two foreign keys, the tool determines the requirements for the new database include that it also comprises three entities and two foreign keys. Whilst the number of entities and foreign keys remains unchanged, various other changes have been made, including: a data type change for the "fromDate" element of the first entity 910 to restrict the number of allowable characters from 30 to 10 and to include a transformation of the data and a data type change for the "toDate" element of the first entity 910 to restrict the number of allowable characters from 30 to 10 and to include a transformation of the data.

In preparing tasks for the differences the tool takes into account the order in which tasks are best executed. As no names have been modified, and no foreign keys are affected, the only changes that are to be made relate to the data type changes for the "fromDate" and "toDate" elements. An execute task is generated and stored for each one. Once all of the tasks have been generated and queued as above they are then executed. As Schema v3 includes a code transformation within "fromDate" and "toDate" elements these transformations are performed as part of executing the execute tasks. As all the execute tasks were executed successfully then the clean tasks are also executed. This is not reported as for a user it is simply a part of successfully executing the tasks and updating the database schema. The tool outputs a notification of successful completion and a summary of the amended entities.

Example 4

In a fourth example a database defined by Schema v1 is updated to Schema v3.

Both the desired schema and the existing schema are read. The three entities and two foreign keys of Schema v1 are detected. As Schema v3 comprises three entities and two foreign keys, the tool determines the requirements for the new database include that it also comprises three entities and two foreign keys. Whilst the number of entities and foreign keys remains unchanged, various other changes have been made, including: a name change from "requests" to "reportRequests" of the first entity 810, 910, a name change from "types" to "ReportTypes" of the second entity 820, 920, a data type change of the "requestedTimestamp" element of the first entity 810, 910 from a time stamp to a time stamp with a time zone, a data type change for the "fromDate" element of the first entity 810, 910 to restrict the number of allowable characters from 30 to 10 and to include a transformation of the data and a data type change for the "toDate" element of the first entity 810, 910 to restrict the number of allowable characters from 30 to 10 and to include a transformation of the data.

In preparing tasks for the differences the tool takes into account the order in which tasks are best executed. For each entity which is renamed, the identification of that element must also be renamed such that it correctly references the new entity name. A task to rename the first entity 810 from "requests" to "reportRequests" is therefore followed by a task to rename the "id" element 811 of the first entity 810 from "requests ID" to "reportRequests ID". Once all the tasks for changes made to the entity 810 have been created a check is made to see whether any foreign keys may be affected. The same steps are then taken for the second entity 820. A task to rename the second entity 820 from "types" to "ReportTypes" is therefore followed by a task to rename the "id" element 821 of the second entity 820 from "types ID" to "ReportTypes ID". Once all the tasks for changes made to the entity 820 have been created a check is made to see whether any foreign keys may be affected. In this case the ID element 821 is used as a foreign key to associate with the "reportTypeCode" element of the first entity 811 and so a foreign key is affected. The tool therefore creates two additional tasks; a foreign key drop task and a fore key creation task. The drop task is inserted before the element rename task and the creation task is inserted after the element rename task. As no changes are made to the third entity 830 no tasks are required with respect to it. Once all of the tasks have been generated and queued as above they are then executed. As Schema v3 includes a code transformation within "fromDate" and "toDate" elements these transformations are performed as part of executing the execute tasks. As all the execute tasks were executed successfully then the clean tasks are also executed. This is not reported as for a user it is simply a part of successfully executing the tasks and updating the database schema. The tool outputs a notification of successful completion and a summary of the amended entities.

Example 5

In a fifth example a database defined by Schema v1 is updated to Schema v3, as per the fourth example, but with an error occurring in converting some data points into the new expected format.

This fifth example follows the same path as the fourth example until an error occurs when the execute tasks are being executed. During the execution of the execute tasks the two code transformations tasks (database specific task) are also run. The first of these, relating to the "fromDate" element, is carried out successfully for all of the items within that element (i.e. rows) in this case 134. The second, relating to the "toDate" element, is successfully completed for the first 67 items, but then encounters an error at the 68$^{th}$. The tool therefore enacts a reversion of all of the tasks executed up to that point. Reverting comprises executing the undo tasks. The undo tasks undo the execute tasks in the reverse order to which the execute tasks were executed. The task that failed was a type change task for the "toDate" element, the undo tasks therefore start at this point. The 67 successfully completed items of the "toDate" element are undone. All of the items are then reverted for the type change task for the "fromDate" element, and then followed by the "requestedTimestamp" element. The rename tasks are then undone, the ID element 811 rename first and then the first entity 810 rename second ("reportRequests" back to "requests").

Once all of the executed execute tasks are successfully executed the tool outputs a notification notifying the user that the update has failed, but that the database has successfully been reverted. An indication of where the error occurred (row 68 in this example) is also provided, as well as an advisement to fix any related errors before retrying the update, Various modifications can be made to the features and examples described above without departing from the scope of the appended claims. Features of the examples and embodiments may be exchanged, combined, omitted or adapted. The teaching of the specification should be taken as a whole with no limitation placed on scope of the appended claims by reference to the included description and drawings.

The invention claimed is:

1. A computer implemented method comprising:
   reading a first database schema;
   reading a second database schema;
   translating the first database schema and the second database schema into an open-standard database interchange format;
   comparing the translated first and second database schemata;
   based on the comparison, generating execute tasks for converting a database defined by the first database schema into a database defined by the second database schema;
   based on the generated execute tasks for converting a database defined by the first database schema into a database defined by the second database schema, controlling a device to execute the generated execute tasks in a defined order causing generation of a draft database;
   upon the draft database being generated successfully, defining a set of cleaning tasks;
   performing the cleaning tasks on the draft database comprising finalizing the execute tasks and creating a new database from the draft database, thus converting the draft database into a clean database; and
   outputting the clean database that has been updated from the first database schema to the second database schema.

2. A method according to claim 1 further comprising:
   upon one or more of the execute tasks not being executed successfully, undoing the execute tasks executed up until a point of failure in a reverse order in which they were executed;
   identifying an error causing the failure and rectifying the error; and
   retrying the execute tasks in the defined order.

3. A method according to claim 2 wherein, the error occurs due to one or more of i) the execute tasks being in an incorrect order, ii) a discrepancy between the execute task and database specific instructions, and iii) corrupted data.

4. A method according to claim 2 wherein undoing the execute tasks comprises undoing the execute tasks in reverse order to which they were executed.

5. A method according to claim 1, wherein executing the execute tasks comprises creating a temporary database and executing the clean tasks comprises creating a new database and discarding the temporary database.

6. A method according to claim 1 wherein, performing the cleaning tasks comprises performing the cleaning tasks in a same order in which their respective execute tasks were executed.

7. A method according to claim 1 wherein comparing the translated first and second database schemata comprises:

comparing a number of entities in each schema; and comparing a number of foreign keys in each schema.

8. A method according to claim 1 wherein finalizing the execute tasks includes making permanent all of the execute tasks.

9. A method according to claim 1, wherein the second database schema comprises information relating to the first database schema and the information relating to the first database schema comprises:

i) a previous schema entity name ii) a previous schema element name; and/or ii) a previous schema data type of a previous schema element.

10. A method according to claim 1 further comprising storing the execute tasks in a queuing mechanism in preparation for their execution in the defined order.

11. A method according to claim 1 wherein the defined order is determined, at least in part, in dependence on foreign key information of the schemata, and optionally in which a delete foreign key task is ordered to occur before a rename task and a recreate foreign key task is ordered to occur after the rename task.

12. A method according to claim 1 further comprising, outputting a proposed mitigation to mitigate further failures if the execution of the execute tasks fails.

13. A system comprising:

a memory storing instructions; and a processor configured to execute the instructions stored in the memory to:

read a first database schema;

read a second database schema;

translate the first database schema and the second database schema into an open-standard database interchange format;

compare the translated first and second database schemata;

based on the comparison, generate execute tasks for converting a database defined by the first database schema into a database defined by the second database schema;

based on the generated execute tasks for converting a database defined by the first database schema into a database defined by the second database schema, control a device to execute the generated execute tasks in a defined order causing generation of a draft database;

upon the draft database being generated successfully, define a set of cleaning tasks;

perform cleaning tasks on the draft database comprising finalizing the execute tasks and create a new database from the draft database, thus converting the draft database into a clean database; and output the clean database that has been updated from the first database schema to the second database schema.

14. A non-transitory computer-readable storage medium comprising instructions which, when executed by a computer, cause the computer to carry out a method of:

reading a first database schema;

reading a second database schema;

translating the first database schema and the second database schema into an open-standard database interchange format;

comparing the translated first and second database schemata;

based on the comparison, generating execute tasks for converting a database defined by the first database schema into a database defined by the second database schema;

based on the generated execute tasks for converting a database defined by the first database schema into a database defined by the second database schema, controlling a device to execute the generated execute tasks in a defined order causing generation of a draft database;

upon the draft database being generated successfully, defining a set of cleaning tasks;

performing the cleaning tasks on the draft database comprising finalizing the execute tasks and creating a new database from the draft database thus converting the draft database into a clean database; and outputting the clean database that has been updated from the first database schema to the second database schema.

15. The system of claim 13, wherein the processor is further configured to execute the instructions stored in the memory to:

upon determining that one or more of the execute tasks not being executed successfully, undo the execute tasks executed up until a point of failure in a reverse order in which they were executed;

identify an error causing the failure and rectify the error; and retry the execute tasks in the defined order.

16. The system of claim 15, wherein, the error occurs due to one or more of i) the execute tasks being in an incorrect order, ii) a discrepancy between the execute task and database specific instructions, and iii) corrupted data.

17. The system of claim 13, wherein executing the execute tasks comprises creating a temporary database and executing the clean tasks comprises creating a new database and discarding the temporary database.

18. The non-transitory computer-readable storage medium of claim 14, wherein, comparing the translated first and second database schemata comprises:

comparing a number of entities in each schema; and comparing a number of foreign keys in each schema.

19. The non-transitory computer-readable storage medium of claim 14, wherein, the instructions further cause the computer to output a proposed mitigation plan to prevent a recurrence of failure if the execution of the execute task fails.

20. The non-transitory computer-readable storage medium of claim 14, wherein executing the execute tasks comprises creating a temporary database and executing the clean tasks comprises creating a new database and discarding the temporary database.

* * * * *